US007224545B2

(12) United States Patent
Saliba et al.

(10) Patent No.: US 7,224,545 B2
(45) Date of Patent: May 29, 2007

(54) METHODS AND SYSTEMS FOR OVERWRITE PROTECTED STORAGE MEDIA

(75) Inventors: George A. Saliba, Northborough, MA (US); Christopher P. King, Brimfield, MA (US)

(73) Assignee: Quantum Corporation, San Jose, CA (US)

( * ) Notice: Subject to any disclaimer, the term of this patent is extended or adjusted under 35 U.S.C. 154(b) by 446 days.

(21) Appl. No.: 10/826,639

(22) Filed: Apr. 15, 2004

(65) Prior Publication Data

US 2005/0235103 A1 Oct. 20, 2005

(51) Int. Cl.
*G11B 15/18* (2006.01)
*G06F 12/00* (2006.01)

(52) U.S. Cl. .............................. 360/69; 360/48; 711/111

(58) Field of Classification Search ...................... None
See application file for complete search history.

(56) References Cited

U.S. PATENT DOCUMENTS

| | | | | |
|---|---|---|---|---|
| 5,265,082 A | * | 11/1993 | Gniewek et al. | 369/53.45 |
| 5,379,152 A | * | 1/1995 | Odaka et al. | 360/48 |
| 5,517,599 A | * | 5/1996 | Shih | 711/200 |
| 5,535,188 A | * | 7/1996 | Dang et al. | 369/53.21 |
| 5,592,342 A | | 1/1997 | Hall et al. | |
| 5,644,444 A | * | 7/1997 | Braithwaite et al. | 360/60 |
| 5,936,786 A | | 8/1999 | Go et al. | |
| 6,023,388 A | * | 2/2000 | Ikeda et al. | 360/72.1 |
| 6,095,445 A | | 8/2000 | Hentrich | |
| 6,288,989 B1 | * | 9/2001 | Ro et al. | 369/47.13 |
| 6,301,067 B1 | * | 10/2001 | Takayama | 360/48 |
| 6,339,810 B1 | * | 1/2002 | Basham et al. | 711/111 |
| 6,526,482 B1 | * | 2/2003 | Nonoyama et al. | 711/154 |
| 6,583,945 B1 | * | 6/2003 | Bar et al. | 360/60 |
| 6,615,330 B2 | * | 9/2003 | Debiez et al. | 711/163 |
| 6,745,340 B1 | * | 6/2004 | Liu et al. | 714/5 |
| 6,775,087 B2 | * | 8/2004 | Chan et al. | 360/74.1 |
| 6,779,080 B2 | * | 8/2004 | Basham et al. | 711/112 |

(Continued)

FOREIGN PATENT DOCUMENTS

JP  4-102252 A  4/1992

OTHER PUBLICATIONS

Author Unknown. "StorageTek Volsafe Solution," press release located at <http//www.storagetek.shareholder.com/news>, last visited on Jan. 6, 2004, 2 pages total.

(Continued)

*Primary Examiner*—Tan Dinh
*Assistant Examiner*—Dismery Mercedes
(74) *Attorney, Agent, or Firm*—Morrison & Foerster LLP

(57) ABSTRACT

According to one aspect of the invention, methods and systems for operating a magnetic storage media drive to perform read/write operations to magnetic storage media in an overwrite protected mode are provided. In one example, a method includes receiving a write request and associated write data and determining if the magnetic storage medium is overwrite protected. If the storage medium is overwrite protected the method includes writing the write data to the storage medium followed by an EOD marker associated with the end of the write data, allowing write operations to the storage medium after previously written data, and preventing write operations to the storage medium prior to previous EOD markers.

43 Claims, 4 Drawing Sheets

U.S. PATENT DOCUMENTS

| | | |
|---|---|---|
| 6,947,237 B2 * | 9/2005 | Christie, Jr. ................. 360/60 |
| 7,016,137 B2 * | 3/2006 | Kato et al. .................... 360/69 |
| 7,171,511 B2 * | 1/2007 | Yagawa ...................... 711/100 |
| 2002/0035665 A1 | 3/2002 | Basham et al. |
| 2003/0002188 A1 | 1/2003 | Bliss et al. |
| 2003/0043492 A1 | 3/2003 | Chan et al. |
| 2003/0067701 A1 | 4/2003 | Christie, Jr. |
| 2003/0126359 A1 * | 7/2003 | Debiez et al. .............. 711/112 |
| 2003/0126446 A1 | 7/2003 | Debiez et al. |
| 2005/0223162 A1 * | 10/2005 | Evans et al. ................ 711/111 |
| 2006/0002246 A1 * | 1/2006 | Emberty et al. ......... 369/30.03 |

OTHER PUBLICATIONS

Sony. "AIT—Worm. Optimum for Legal Document Archives: Ever-Increasing Need for Large-Capacity, High-Speed Write-Once Solutions," StorageTek Volsafe Solution, Product description located at <http//www.sony.net/Products/Storagesolutions/edv027.html>, last visited on Jan. 6, 2004, 4 pages total.

* cited by examiner

METHODS AND SYSTEMS FOR OVERWRITE PROTECTED STORAGE MEDIA

BACKGROUND

1. Field of the Invention

The invention relates generally to magnetic storage devices and systems, and more particularly to methods and systems for overwrite protected or archive magnetic storage devices such as storage tape cartridges.

2. Description of the Related Art

Magnetic storage devices remain a viable solution for the storage and retrieval of large amounts of data. The use of half-inch magnetic tape cartridges, e.g., such as digital linear tape ("DLT") or linear tape open ("LTO") formats, is well known in the art. Generally, a magnetic storage tape is streamed by a magnetic data transducer head and data is recorded along multiple closely spaced tracks on the tape. The tape may be similarly streamed by the transducer head to read back the stored data. Magnetic storage devices are generally read/write capable and may be erased and written over many times during their lifetime.

In some instances users desire to store data in a non rewritable manner, e.g., such that the data is recorded to the storage device and further writing to the storage device is prevented. This format is typically referred to as a Write Once Read Many (or "WORM") format. Typically, WORM formatted storage devices allow a single write operation and are thereafter a read-only storage device. For example, after data is written to the storage medium of the device, the data cannot be erased, modified, or overwritten by the drive. Optical storage devices such as compact discs are more frequently utilized as WORM media because they generally store information in a permanent form by creating non-removable pits in the media surface.

WORM storage devices are often desirable for protection against accidental or intentional modifications of the data. In other cases, WORM storage devices may be used to satisfy certain regulatory agencies, e.g., relating to financial or medical data storage uses. Accordingly, WORM storage devices are often referred to as "archival" storage devices, where the intent is that the stored data remain secure and unaltered.

Traditionally, data preservation problems have been addressed by providing physical switches, locks, slides, or the like that prevent a drive from recording to a storage medium after the switch has been moved to a WORM mode. For example, a drive may record information to the storage device with the switch in a first position allowing the drive to write to the storage device. Moving the switch to a second write protected position makes the storage device "read-only," e.g., where a suitable drive recognizes the write protected position and is prevented from writing to the storage device. Standard magnetic tape cartridges, such as DLT cartridges, include a record switch that when in a proper position prevents a DLT drive from writing to the storage tape and thereby allows a DLT tape to become read only. The record slide switch, however, may be intentionally or inadvertently reversed to make the media writeable once again. Once the storage device is writeable, data stored thereon can be easily lost or altered if the system overwrites new data over the previously stored data.

In other examples, a record switch is more permanent, for example, a tab that breaks away to make the device read only or a record slide that permanently locks in place. Such permanent "read only" solutions, however, have several drawbacks related to magnetic storage cartridge devices. Once a storage cartridge is dedicated as read only, additional data can not be recorded to any remaining storage capacity of the tape. Accordingly, tape utilization is generally inefficient, especially with the massive storage capacities of typical storage cartridges. For example, files that are desirably stored on a WORM device are often much smaller than the capacity of the WORM device resulting in large amounts of unused and inaccessible storage capacity. The lost storage capacity increases the number of storage devices and cost for storing a given amount of data in a protected manner. Additionally, the increase in storage devices for a given amount of data may slow data access time because the data is stored on a greater number of storage devices, requiring more load/unload operations.

Additionally, archive storage functions are often satisfied with special cartridges (distinct from standard read/write cartridges) and compatible tape drives. For example, a cartridge may include certain characteristics such as size, surface features, cartridge leader features, data format, and the like to be recognized by the drive as a WORM device. Such systems are generally undesirable because of the additional cost of using separate cartridges and/or drives to perform write protected or archival functions.

Accordingly, methods and systems for converting an otherwise standard rewriteable magnetic storage device into an archive or write protected type storage device, and further allowing write append functions while protecting previously stored information, are desired.

BRIEF SUMMARY

According to one aspect of the invention, methods for operating a magnetic storage media drive to perform read/write operations to magnetic storage media are provided. In one example, a method includes receiving a write request and associated write data and determining if the magnetic storage medium is overwrite protected. If the storage medium is overwrite protected the method includes writing the write data to the storage medium followed by an EOD marker associated with the end of the write data, allowing write operations to the storage medium after previously written data, and preventing write operations to the storage medium prior to previous EOD markers.

In subsequent write processes, the media drive may locate a last EOD marker on the storage medium and append the write data after the previously written data. In an initial write process, the media drive may locate the beginning of the medium (e.g., a beginning of tape marker), and write the write data followed by an EOD marker. If the medium is not identified as an overwrite protected storage medium, the write data may be written pursuant to the write request in standard read/write mode. The medium may be identified by a media drive as overwrite protected based on format, physical features (e.g., a switch), drive level processing, or a software command.

In another example, a method includes loading a magnetic storage medium into a magnetic storage media drive, determining if the magnetic storage medium is an overwrite protected storage medium, and if overwrite protected, initializing the storage medium in an overwrite protected mode. The overwrite protected mode preventing the media drive from writing over previously written data and allowing for write append operations, e.g., writing after previously written data. The drive may then perform multiple writing operations to the storage medium, where each successive write operation preserves the previously written data.

In another aspect, a magnetic storage media drive system is provided to perform operations to write data to magnetic storage media in an overwrite protected mode where previously stored data is preserved. In one example the system is configured to operate by receiving a write request and associated write data from a host and determine if a storage medium is overwrite protected. If the storage medium is overwrite protected, the media drive writes the write data to the storage medium followed by an EOD marker associated with the end of the write data, where the media drive is allowed to perform write operations to the storage medium after previously written data, and prevented from write operations prior to previous EOD markers.

In another aspect, a computer readable storage medium containing computer executable code for operating a magnetic storage drive to conduct write operations upon magnetic storage media. The computer executable code may instructing the magnetic storage media drive to operate in an overwrite protected mode as described herein.

The present invention and its various embodiments are better understood upon consideration of the detailed description below in conjunction with the accompanying drawings and claims.

DETAILED DESCRIPTION

Various methods and systems for operating a magnetic storage media drive to write data to magnetic storage media in an overwrite protected format are provided. The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions.

According to one aspect and one example, a storage system and method are described for writing to magnetic storage media, e.g., tape cartridges, wherein standard read/write magnetic storage devices are overwrite protected through drive-level processing. Broadly, the media drive protects previously written data on an overwrite protected storage device and allows the drive to write new data to the storage device after the previously written protected data, e.g., appending at the end of data. Accordingly, the storage device is not a conventional write once device (e.g., the device is not limited to a single write operation and then read only); rather the device may be written to multiple times and stored data is protected from erasure, modification, and overwriting by the drive. Further, the drive system may initialize and format standard read/write storage devices as overwrite protected and not enable any subsequent overwriting/modifications of data, re-initialization, erase operations, or the like. The cartridge may be identified as an overwrite protected storage device through a manual/physical switch or through a software overwrite protected command and thereafter be recognized as, and treated as, an archival, overwrite protected device allowing appending at the end of previously recorded data.

The exemplary methods and systems may be carried out on drive-level or host-level processing. For example, an overwrite protected cartridge is initialized and formatted by a drive system such that the cartridge is recognized and handled as an overwrite protected cartridge by that or similar drive systems. In this manner, the exemplary methods and systems allow for standard read/write cartridges to be converted into overwrite protected or archive storage cartridges at the drive-level or host-level. Converting standard cartridges into overwrite protected cartridges may provide advantages over special purpose, typically higher cost, archival cartridges. Conventional media drives may be modified with appropriate software, firmware, or hardware (alone or in combination) to carry out the exemplary methods.

Figure 1:
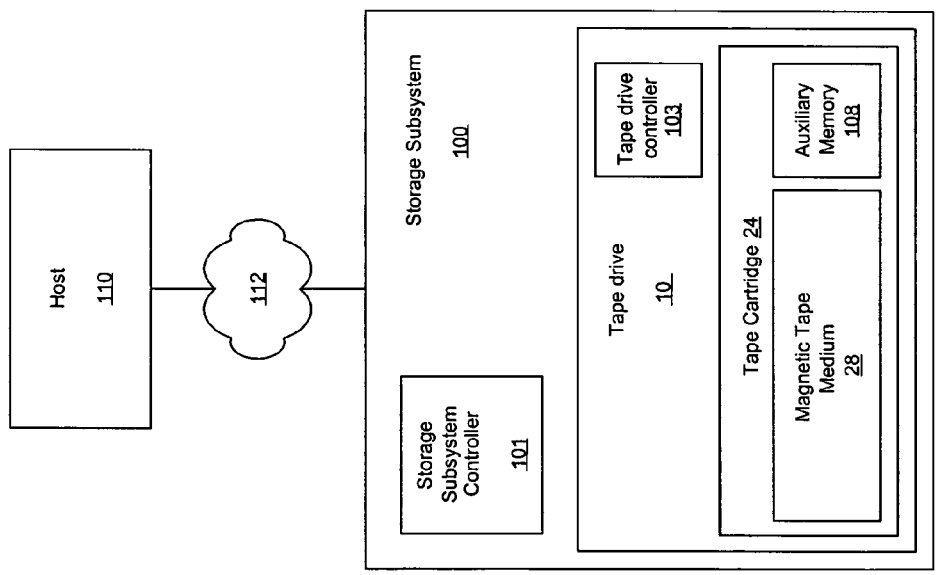
FIG. 1 illustrates an exemplary storage system.

Storage systems, such as magnetic tape libraries, are widely used for storing information in digital form. An exemplary tape storage subsystem 100 is illustrated in FIG. 1. Storage subsystems 100 may include a storage subsystem controller 101 for controlling one or more tape drives 10 contained within the storage subsystem 100 and for controlling other components of the storage subsystem 100, such as the tape picker, which is used to select and load tape cartridges 24 into the tape drives 10. The storage subsystem 100 may be coupled to a host system 110, which transmits I/O requests to the storage subsystem 100 via a host/storage connection 112.

Figure 2:
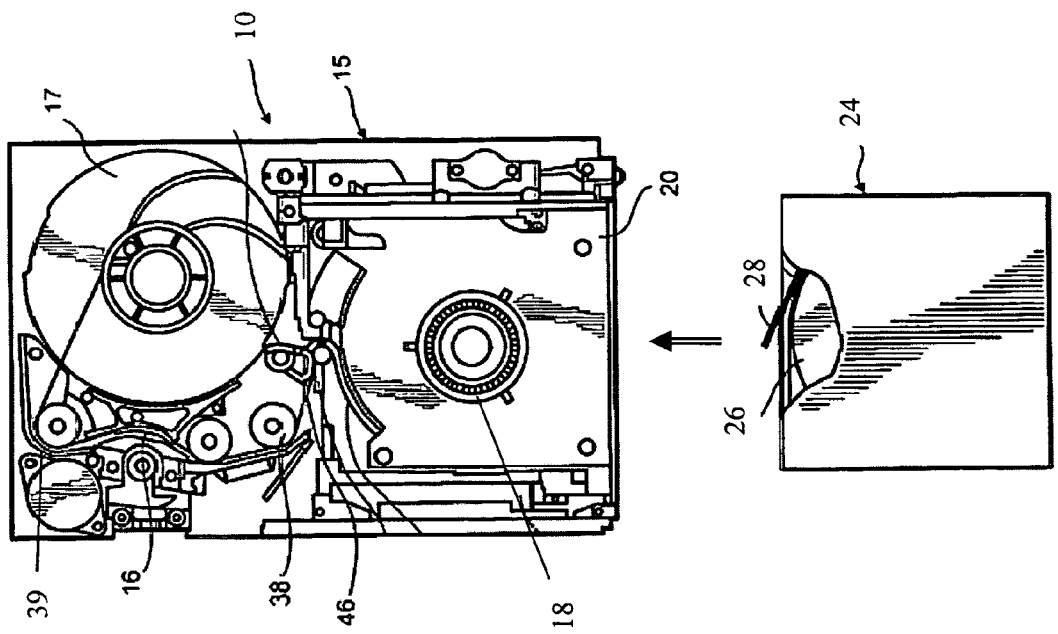
FIG. 2 illustrates an exemplary tape drive system for the storage and retrieval of data from storage cartridges.

Tape drive 10 reads and writes data to the primary storage medium, shown in FIG. 1 as a magnetic tape medium 28 contained within a removable magnetic tape cartridge 24. Cartridge 24 may additionally include an auxiliary memory device 108 (or emulated auxiliary memory storage stored on medium 28) as is known in the art. With reference to FIG. 2, exemplary tape drive 10 is illustrated in greater detail. Tape drive 10 includes a tape drive housing 15, a data transducer, i.e., read and/or write head 16, a take-up reel 17, and a receiver 20. Tape drive 10 is used in conjunction with a cartridge 24 which houses a storage tape 28 on supply reel 26. Receiver slot 20 is configured to receive a suitable cartridge 24 therein adjacent reel driver 18. Tape drive 10 may also include a door and various mechanisms for receiving and ejecting cartridge 24. When cartridge 24 is received in receiver slot 20 a buckler motor 46 or the like may engage a cartridge leader and stream storage tape 28 along a tape path within tape drive 10 passing read/write head 16 and onto take-up reel 17. The tape path may include various tape guides 39, rollers 38, one or more read/write heads 16, and the like before being wound upon take-up reel 17.

Cartridge 24 generally includes a substantially rectangular cartridge housing which encloses cartridge reel 26 and storage tape 28. Cartridge 24 may further include a cartridge door to protect storage tape 28 therein and a cartridge leader (not shown), which is exposed when the door is open. Storage tape 28 generally includes a thin film of magnetic material that may store information in a form, e.g., digital, that may be subsequently retrieved if desired. Storage tape 28 may be approximately one-half inch in width and have a thickness of approximately 0.5 mils (0.0005 inch) or thinner. Typically, storage tape 28 includes a storage surface on one side of storage tape 28 that may be divided into a plurality of parallel tracks along the length of storage tape 28. Alternatively, the data may be recorded in diagonal strips across storage tape 28.

Various other features of a tape drive may be included, for example, various buckler systems, rollers, tape guides, receiving mechanisms, dampers, and the like may be used. A detailed description of various components of a tape drive system that may be used is provided in U.S. Pat. No. 6,095,445, entitled "CARTRIDGE BUCKLER FOR A TAPE DRIVE," which is incorporated herein by reference in its entirety. A representative magnetic tape drive for which exemplary methods and system may be used is sold by Quantum Corporation under the trademark SDLT™ 320.

Figure 3:
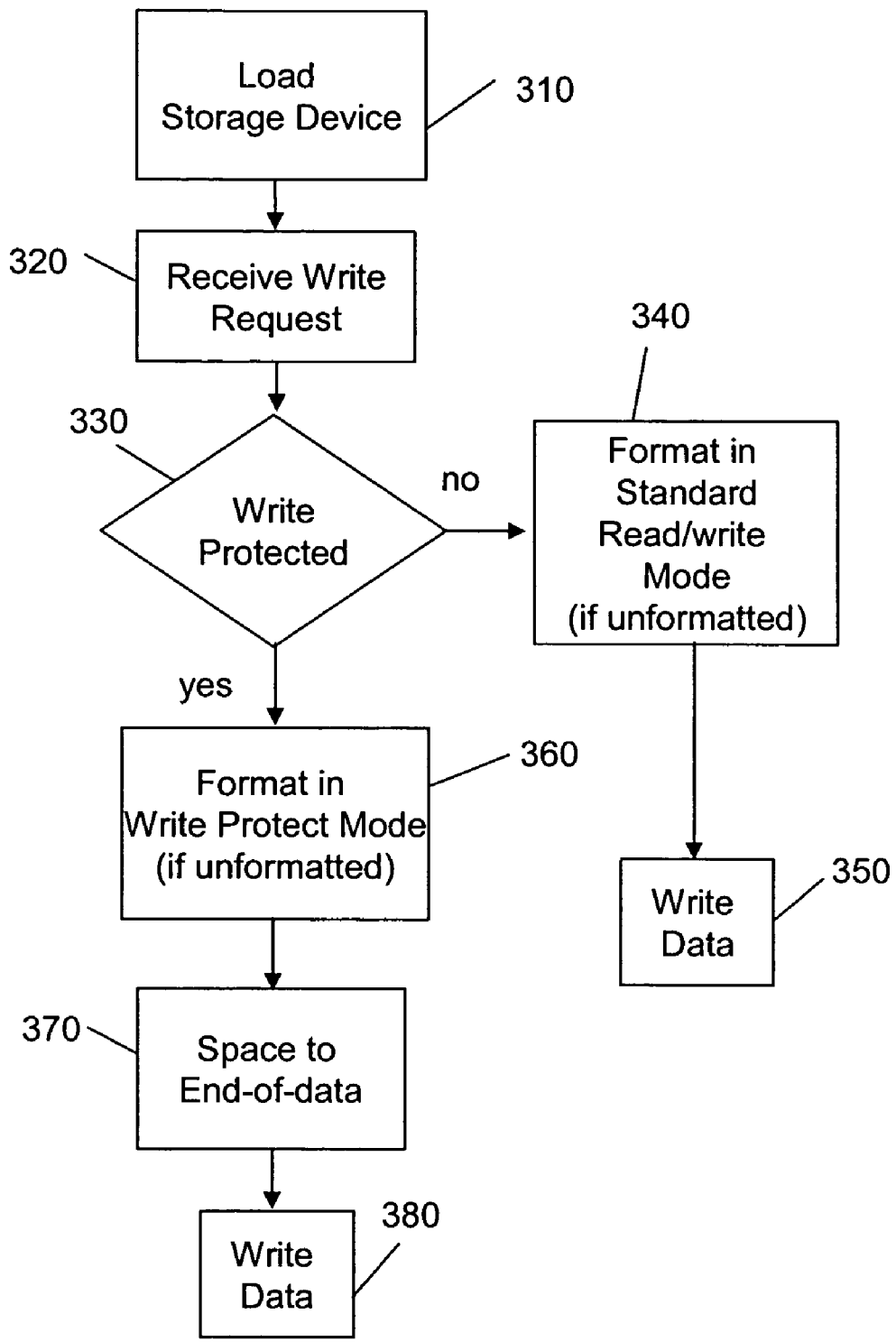
FIG. 3 illustrates an exemplary method for the operation of a storage drive system having an overwrite protected mode and a standard write mode.

FIG. 3 illustrates an exemplary method for operating a magnetic media drive to initialize and write to magnetic storage cartridges in an overwrite protected mode or standard read/write mode. Generally, storage tape cartridges, e.g., DLT and SDLT cartridges, are manufactured in very high volume with no factory based tape related data (i.e., blank). Upon the first load and operation of a tape cartridge in the drive system, the drive system formats the cartridge for operation by writing certain calibration tracks, tape based information, and other data such as directory, Fine Alignment Field ("FAF"), Coarse Alignment Field ("CAF"), and the like.

In one example, a blank unformatted cartridge is loaded into a media drive system in block 310 in response to a write request received in block 320, which may also include accompanying write data to be written to the cartridge. The system determines whether to format the blank cartridge as an overwrite protected cartridge or to format the cartridge as a standard read/write cartridge in block 330. The system may determine to format the cartridge as an overwrite protected cartridge based on a physical switch on the cartridge, a command from the host system, an auxiliary memory device associated with cartridge, manual decision by a user, or the like.

If the cartridge is not to be formatted as an overwrite protected cartridge, the drive proceeds to format the cartridge as a standard read/write cartridge in block 340, e.g., by writing alignment fields, calibration data, directory information, and the like associated with a standard read/write format. The write data may then be conventionally stored in block 350 according to the write request received in block 320.

If the cartridge was previously formatted as a standard read/write cartridge, e.g., in a previous load and initialization sequence, the drive system proceeds to block 350 (after determining the storage cartridge is not overwrite protected) and stores the data according to the write request without formatting the cartridge in block 340. In the standard mode, previously written data may be overwritten by the current write data. The drive may determine the status of a previously formatted storage cartridge based on indicators such as physical switches and the like as well as based on the formatting of the cartridge, e.g., directory information associated with the storage cartridge.

If the system determines the cartridge is an overwrite protected cartridge, or is to be formatted as an overwrite protected cartridge, the system proceeds to format the cartridge accordingly in block 360, e.g., by writing alignment fields, calibration data, directory information, and the like associated with an overwrite protected format. In an initial write process in the overwrite protected format, where the cartridge was initialized and formatted in block 360, the system may then write user data to the cartridge in block 380. Additionally, the system may check that the cartridge is blank and position at the beginning of the tape.

If however, the cartridge was previously initialized and formatted in an overwrite protected format, the tape is advanced to the end of any previously written data in block 370, e.g., by forwarding to a data segment or marker associated with the end of data on the tape, and the write request is carried out in block 380. For example, a space to the end-of-data ("EOD") marker command is issued to advance the tape to the end of previously recorded data. The EOD marker may include a data segment, mark, or other feature recognizable by the drive and associated with the end of previously recorded data. In other examples, the drive system may issue an error message and/or abort the write process if the drive is not positioned at the EOD marker of the storage cartridge. The system may then issue a rewind and/or space to EOD before allowing the write operation.

In one example, the exemplary methods and systems include DLT tape cartridges and compatible DLT drives. DLT tape cartridges include a write protect switch. The normal operation of the drive in response to the switch in a write protect position is to disable any further writing to the cartridge once the user or the host determines that the data writing or overwriting is complete. In one example of the present method, the cartridge format, e.g., standard read/write or overwrite protected, is determined by the system upon the first initialization of a blank standard cartridge. The system may determine the mode based on the write protect switch, a software overwrite protected command, or the like. In one example, if the cartridge is initialized and formatted into an overwrite protected mode, the cartridge is configured for its life in the overwrite protected mode. The drive and system will not enable any subsequent overwriting, re-initialization, erasures, or any data modification, even if, for example, the physical switch is moved back to a standard cartridge format.

In one example, a cartridge originally formatted as a standard read/write cartridge may be erased and/or reformatted as overwrite protected by a drive, but an overwrite protected cartridge may not be erased and/or reformatted by the drive as a standard read/write cartridge. In other examples, a storage system may be configured to allow an overwrite protected cartridge to be erased and/or reformatted as a standard read/write cartridge depending, for example, on the particular application and use.

Those of ordinary skill in the art will recognized that various blocks depicted in FIG. 3 may be omitted or altered, that the blocks may be carried out in other orders or in parallel, and additional or fewer actions are possible. For example, an unformatted cartridge may be formatted without receiving a write request, and blocks 340 and 360 may be omitted for previously formatted cartridges. Additionally, the exemplary method and functionality described with respect to FIG. 3 may be implemented equivalently in one or more of software, firmware, hardware, or other available functional components or building blocks. Additionally, the exemplary methods may be embodied in computer readable storage medium capable of being directly or indirectly accessible by a storage system.

Figure 4:
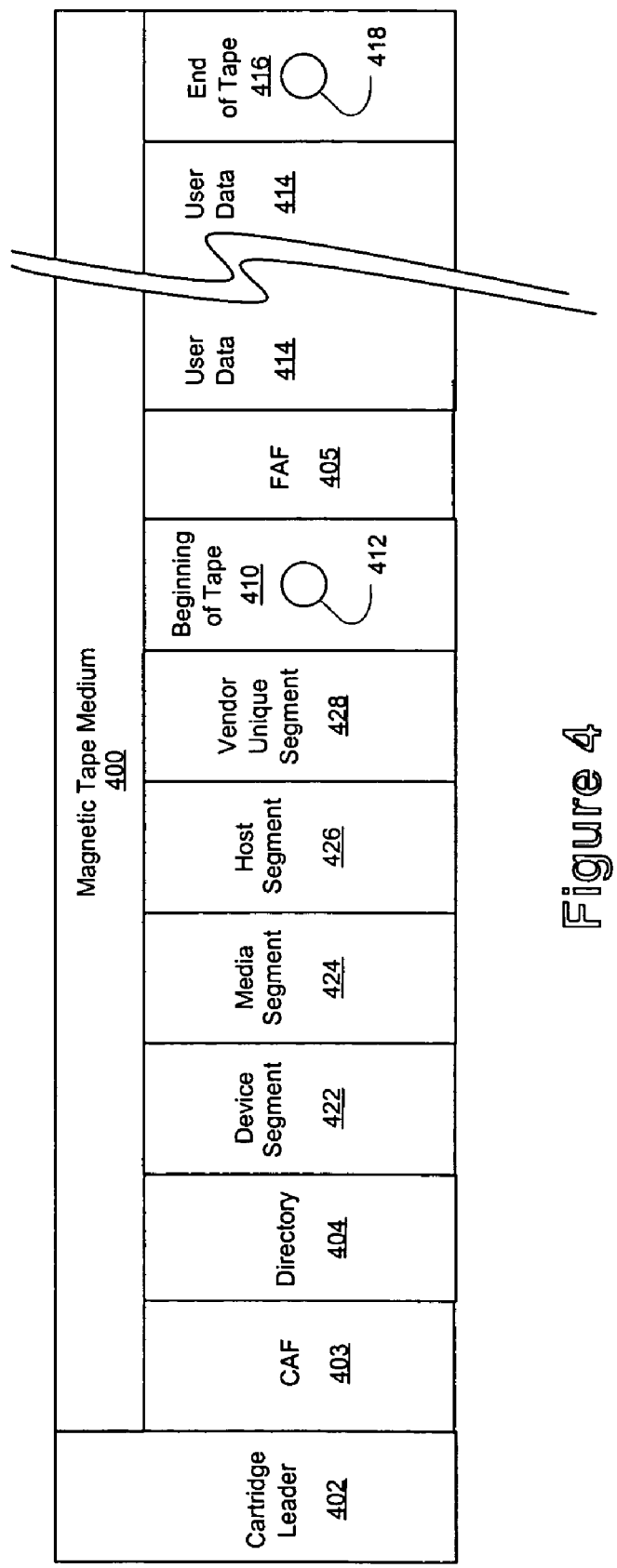
FIG. 4 is a block diagram illustrating a magnetic storage medium.

FIG. 4 illustrates a block diagram of an exemplary magnetic storage medium 400 after being formatted in either an overwrite protected format or standard read/write format. At the beginning of the magnetic tape medium 400 is the cartridge leader 402. The cartridge leader 402 is configured to couple to a buckle mechanism of a drive leader of a tape drive and is not used to store data. A CAF region 403 and FAF region 405 are included to assist in initial drive calibration processes. Next is a directory region 404 that stores conventional directory data used to enable a tape drive to access user data in an efficient manner.

Device segment 422 may be used to store performance information including error data relating to the cartridge, drive history information, and other predictive failure information. For example, device segment 422 can be used to store device attributes such as data regarding the operation of the tape drive such as, for example, the load count for that particular tape cartridge. In one example, the load count of the cartridge may be compared to a load count of the drive to verify the integrity of the stored information. Further, information relating to drive related channel problems, drive related servo tracking problems, magnetic tape defect errors, tracking servo tape errors, and the like may be stored. It should be recognized, however, that history and error data may be stored in other segments, and in other locations, and may be further distributed over more than one data segment of tape medium 400. For example, history and error information may be stored and retrieved from directory 404.

Format information relating to an overwrite protected mode or standard read/write mode may by included in one or more of the data segments written to tape medium 400. Format information may also be included in one or more of directory region 404, CAF region 403, and BOT holes (e.g., the number or positioning of holes).

Additional segments may also be included in the exemplary data format shown in FIG. 4. Media segment 424 can be used to store attributes of the magnetic tape medium 400. These attributes can include, for example, the tape manufacturer's identity, the production date, or other information relating to the identity of the tape medium 400. Host segment 426 can be used to store host attributes. These host attributes may include any data which the host may wish to store. This can include, for example, a tape label, a date stamp, and information identifying the host writing the data to the tape cartridge. It may be desired to provide unlimited read and write access to the host segment 426.

After the beginning of tape region 410, which is indicated by a beginning of tape hole 412. A FAF region 405 is positioned adjacent the beginning of tape region 410 to assist in calibration. In operation, a tape drive searches for the beginning of tape hole 412 to determine where to begin storing the user data in the user data region 414. After the user data region 414 is an end of tape region 416 marked by an end of tape hole 418.

It is noted that FIG. 4 is not to scale; in typical tape cartridges, the user data region 414 consumes the vast majority of the length of the magnetic tape medium 400. Those of ordinary skill in the art will recognized the data segments shown and described are illustrative only. An exemplary storage medium may include fewer or additional data segments. Additionally, one or more of the data segments shown and described may be included in an auxiliary memory device associated with the storage cartridge or formatted to emulate an auxiliary memory device.

Figures 5A, 5B:
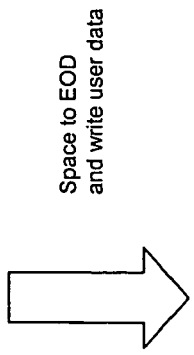
FIGS. 5A and 5B are block diagrams illustrating a region of a magnetic storage medium.

FIGS. 5A and 5B are block diagrams illustrating a portion of user data region 414 of magnetic storage medium 400 in an exemplary overwrite protected operation. In this example, tape medium 400 includes several blocks of previously recorded user data 414a–c and an EOD marker 415 along a data track. EOD marker 415 is recorded by a drive at the end of a write operation and may include any recognizable mark that indicates to the drive where the previously written data ends. The remaining portion of the user data portion 414 beyond the EOD marker is empty.

Assuming tape 400 is formatted and recognized by a drive system as an overwrite protected storage medium, the drive system, in one example, loads the cartridge and issues a space to an EOD marker upon receiving a write request and associated write data (if the tape medium 400 is not formatted the drive system will format the tape and write the data after the beginning of tape hole and any alignment data). The space to EOD marker positions a write head of the drive system at EOD marker 415. From this position the drive may write new data with out overwriting the previous user data 414a–c. The drive appends the write data at the EOD marker 415, e.g., writing user data blocks 414d–f over the EOD marker 415 and within the unused portion of tape 400. A new EOD marker 415a is recorded at the conclusion of the write operation indicating the end of overwrite protected data that may be used in subsequent write operations. In this manner, multiple write operations may be carried out to tape medium 400 while protecting previously written user data.

EXAMPLE

A DLT drive was configured with appropriate software to operate in an overwrite protected mode and a standard read/write mode. In this example, the overwrite protected mode was triggered by a write protect switch included with a conventional DLT cartridge. First, a blank DLT cartridge was loaded into the drive with the write protect switch turned on, and a write data command was issued from a host to the drive. The drive determined that the cartridge was in a write protect mode and proceeded to write appropriate alignment fields, calibration data, and directory information to the tape associated with an overwrite protected mode followed by the data associated with the write data command. A rewind command was issued followed by a second write data command. The second write data command was rejected by the drive because the drive was not positioned at the EOD marker, i.e., the drive would not allow the previously written data to be modified by overwriting operations. A space to EOD was issued followed by a write data command which was accepted and the write data recorded to the tape. The EOD marker was overwritten and a new EOD marker included at the end of the newly written data.

Additionally, a blank cartridge was loaded into the drive with the write protect switch turned off. A write data command was issued from a host to the drive. The drive determined that the cartridge was not overwrite protected and proceeded to write alignment fields, calibration data, directory information, and the like associated with a standard read/write cartridge, followed by the write data. A rewind was issued followed by another write data command. The write data command was accepted by the drive and proceeded to overwrite the previously written data as would be expected for a standard read/write tape cartridge.

In addition to the above overwrite protected methods and system, additional features may be included. In one example, anti piracy protection may be included in an auxiliary memory or emulated auxiliary memory ("EMAM") directory associated with the storage device by logging appropriate command sequences. In another example, tamper evident features such as storing a load count on the cartridge, which is also stored with the storage system (e.g., the host) may be included. A difference in the cartridge load count and system load count may indicate modifications to the stored data.

In another example, various encryption may be included as an optional feature of the directory information and/or all stored overwrite protected data. Various encryption methods and systems known in the art may be employed.

The exemplary methods and systems format standard cartridges into overwrite protected cartridges and may be difficult to identify as such without loading into a drive system. Accordingly, in one example, a sticker or other identifier may be provided to allow visual identification of these cartridges. In other examples, cartridges with different color housings may be used to identify the particular use. In other examples, tamper evident features may be included or added such as a sticker or seal that if broken indicate the cartridge has been compromised.

The above detailed description is provided to illustrate exemplary embodiments and is not intended to be limiting. It will be apparent to those of ordinary skill in the art that numerous modification and variations within the scope of the present invention are possible. Additionally, particular examples have been discussed and how these examples are thought to be advantageous or address certain disadvantages in related art. This discussion is not meant, however, to restrict the various examples to methods and/or systems that actually address or solve the disadvantages.

The invention claimed is:

1. A method for operating a magnetic storage media drive to perform write operations upon removable serially accessible magnetic storage media in an overwrite protected mode, the method comprising:
    receiving a write request and associated write data;
    determining if a magnetic storage medium is overwrite protected; and
    if the storage medium is overwrite protected
        writing the write data to the storage medium followed by an EOD marker associated with the end of the write data,
        allowing write operations to the storage medium after previously written data, the write operations overwriting a previous EOD marker associated with the previously written data, and
        preventing write operations to the storage medium prior to the previous EOD marker.

2. The method of claim 1, wherein if the storage medium is overwrite protected, further comprising locating the last EOD marker on the storage medium, and appending the write data after previously written data.

3. The method of claim 1, wherein if the storage medium is overwrite protected and no EOD marker is present, further comprising locating a beginning of data indicator on the storage medium, and appending the write data after the beginning of data indicator.

4. The method of claim 1, further comprising, if the storage medium is not overwrite protected, writing the write data pursuant to the write request.

5. The method of claim 1, further comprising locating a portion of the storage medium before a last EOD marker, forwarding to the last EOD marker, and appending the write data at the last EOD marker.

6. The method of claim 1, further comprising, if the storage medium is overwrite protected, formatting the storage medium to be recognized as overwrite protected.

7. The method of claim 1, wherein the media drive determines if the storage medium is overwrite protected based on a physical feature associated with the storage medium.

8. The method of claim 1, wherein the media drive determines if the storage medium is overwrite protected based on a software command.

9. The method of claim 1, wherein the media drive determines if the storage medium is overwrite protected based on drive level processing.

10. The method of claim 1, wherein the drive determines if the cartridge is overwrite protected based on the formatting of the storage medium.

11. The method of claim 1, further including preventing the drive from erasing previously written data stored on the storage medium if the storage medium is overwrite protected.

12. The method of claim 1, wherein the write data overwrites a last EOD marker.

13. The method of claim 1, wherein the magnetic storage medium includes a magnetic storage tape.

14. A method for operating a magnetic storage media drive to perform write operations upon removable serially accessible magnetic storage media, the method comprising:
    determining if a magnetic storage medium is an overwrite protected storage medium;
    if overwrite protected, initializing the storage medium in an overwrite protected mode, wherein the overwrite protected mode prevents the media drive from writing to the storage medium prior to a previously written EOD marker and allows for write append operations; and
    writing write data to the storage medium overwriting the previously written EOD marker and followed by an EOD marker associated with the end of the write data.

15. The method of claim 14, wherein a subsequent writing operation in the overwrite protected mode includes locating the EOD marker on the storage medium and appending the write data after the previously written write data.

16. The method of claim 14, wherein the media drive determines if the storage medium is overwrite protected based on a physical feature associated with the storage medium.

17. The method of claim 14, wherein the media drive determines if the storage medium is overwrite protected based on a software command.

18. The method of claim 14, wherein the media drive determines if the storage medium is overwrite protected based on drive level processing.

19. The method of claim 14, further comprising preventing the drive from erasing previously written write data stored on the storage medium if the storage medium is overwrite protected.

20. A magnetic storage media drive system configured to perform operations to write data to magnetic storage media in an overwrite protected mode where previously stored data is preserved, the operations comprising:
    receiving a write request and associated write data from a host;
    determining if a storage medium is overwrite protected; and
    if the storage medium is overwrite protected
        writing the write data to the storage medium followed by an EOD marker associated with the end of the write data,
        allowing write operations to the storage medium after previously written data, the write operations overwriting a previous EOD marker associated with the previously written data, and
        preventing write operations prior to an EOD marker.

21. The system of claim 20, wherein if the storage medium is overwrite protected, further comprising locating a last EOD marker on the storage medium, and appending the write data after previously written data.

22. The system of claim 20, wherein if the storage medium is overwrite protected and no EOD marker is present, further comprising locating a beginning of data indicator on the storage medium, and appending the write data after the beginning of data indicator.

23. The system of claim 20, further comprising, if the storage medium is not overwrite protected, writing the write data pursuant to the write request.

24. The system of claim 20, further including locating a portion of the storage medium before a last EOD marker, forwarding to the last EOD marker, and appending the write data at the last EOD marker.

25. The system of claim 20, further comprising formatting the storage medium to be recognized as overwrite protected.

26. The system of claim 20, wherein the media drive determines if the storage medium is overwrite protected based on a physical feature associated with the storage medium.

27. The system of claim 20, wherein the media drive determines if the storage medium is overwrite protected based on a software command.

28. The system of claim 20, wherein the media drive determines if the storage medium is overwrite protected based on drive level processing.

29. The system of claim 20, wherein the drive determines if the cartridge is overwrite protected based on the formatting of the storage medium.

30. The system of claim 20, further including preventing the drive from erasing previously written data stored on the storage medium if the storage medium is overwrite protected.

31. A computer readable storage medium containing computer executable code for operating a magnetic storage drive to conduct write operations upon magnetic storage media in an overwrite protected mode by instructing the magnetic storage drive to operate as follows in response to receiving a write request and associated write data:
   determine if a storage medium is overwrite protected; and
   if the storage medium is overwrite protected
      write the write data to the storage medium followed by an EOD marker associated with the end of the write data,
      allow write operations to the storage medium after previously written data, the write operations overwriting a previous EOD marker associated with the previously written data, and
   prevent writing operations to the storage medium prior to an EOD marker associated with the end of previous write data.

32. The computer readable storage medium of claim 31, wherein if the storage medium is overwrite protected, further comprising locating a last EOD marker on the storage medium, and appending the write data after previously written data.

33. The computer readable storage medium of claim 31, wherein if the storage medium is overwrite protected and an EOD marker is not present, further comprising locating a beginning of data indicator on the storage medium, and appending the write data after the beginning of data indicator.

34. The computer readable storage medium of claim 31, further comprising, if the storage medium is not overwrite protected, writing the write data per the write request.

35. The computer readable storage medium of claim 31, further comprising locating a portion of the storage medium before a last EOD marker, forwarding to the last EOD marker, and appending the write data at the last EOD marker.

36. The computer readable storage medium of claim 31, further comprising formatting the storage medium to be recognized as overwrite protected.

37. The computer readable storage medium of claim 31, wherein the media drive determines if the storage medium is overwrite protected based on a physical feature associated with the storage medium.

38. The computer readable storage medium of claim 31, wherein the media drive determines if the storage medium is overwrite protected based on a software command.

39. The computer readable storage medium of claim 31, wherein the media drive determines if the storage medium is overwrite protected based on drive level processing.

40. The computer readable storage medium of claim 31, wherein the drive determines if the cartridge is overwrite protected based on the formatting of the storage medium.

41. The computer readable storage medium of claim 31, further comprising preventing the drive from erasing previously written data stored on the storage medium if the storage medium is overwrite protected.

42. A magnetic storage media drive system configured to perform operations to write data to magnetic storage media in an overwrite protected mode where previously stored data is preserved, the operations comprising:
   receiving a write request and associated write data;
   determining if a storage medium is overwrite protected; and
   if the storage medium is overwrite protected
      forwarding to an EOD marker associated with previously written data,
      appending the write data adjacent the previously written data followed by a new EOD marker, and
      preventing write operations to the storage medium prior to the last EOD marker.

43. The system of claim 42, wherein the appended write data overwrites the EOD marker associated with the previously written data.

* * * * *